Oct. 17, 1933.  C. H. NEHLS  1,931,080
SPARE WHEEL CARRIER AND LOCK
Filed Feb. 24, 1931  2 Sheets-Sheet 1
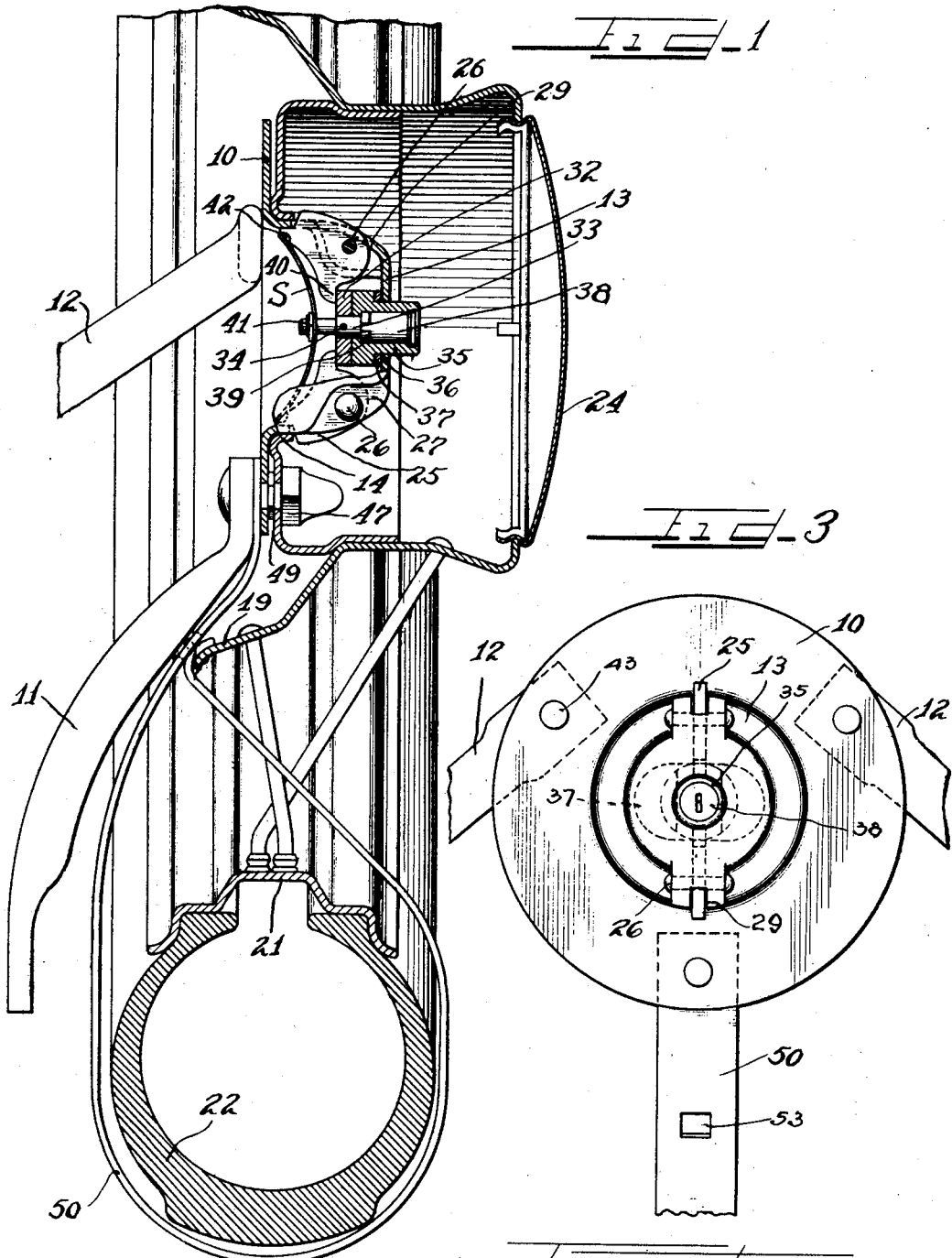
Inventor
Charles H. Nehls.

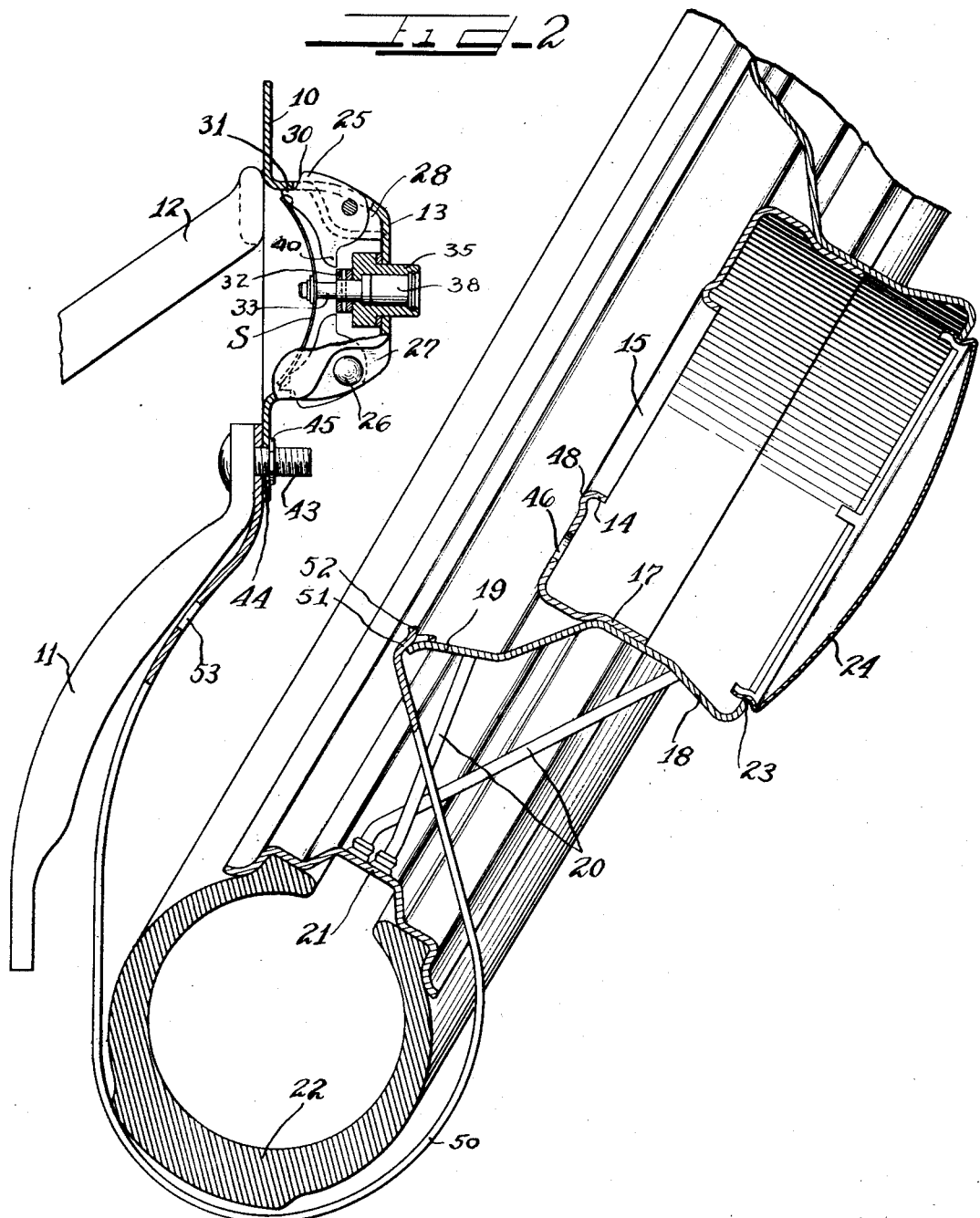

Patented Oct. 17, 1933

1,931,080

UNITED STATES PATENT OFFICE 1,931,080

SPARE WHEEL CARRIER AND LOCK

Charles H. Nehls, Detroit, Mich., assignor to Oakes Products Corporation, North Chicago, Ill., a corporation of Michigan Application February 24, 1931. Serial No. 517,679

11 Claims. (Cl. 224—29)

This invention relates to tire carrier structures and particularly to simplified and improved mechanism for retaining a spare wheel thereon to guard against theft, the invention being particularly applicable to wire wheels.

An important object of the invention is to provide a support for receiving the hub of a wheel, together with latch mechanism operating automatically to lock the wheel to the support and a lock for retaining the latch mechanism in latching or locking condition after application of the wheel to the support.

A further object is to provide latch members which are spring actuated to yield when the wheel is applied to the support but which then are automatically moved into latching position to retain the wheel on the support, together with a manually operable lock for retaining the latch members in latching position.

Another object is to provide latching members, which after release by the lock mechanism, may be manually shifted out of latching position to permit removal of the wheel from the support.

Still a further object is to provide a tire lock band secured to the carrier and automatically locked in closed position around the rim and tire of the wheel when the wheel is applied to the support.

Still a further object is to adapt the locking band to exert outward pressure against the wheel to automatically assist in swinging the wheel clear of the latch members when said latch members have been shifted out of latching position.

The above enumerated and other features of my invention are incorporated in the structure disclosed on the drawings, in which drawings Figure 1 is a vertical diametral section through a wheel and its carrier or support, the wheel being shown locked to the carrier;

Figure 2 is a similar view showing the wheel applied in the locking band and about to be swung into latching engagement with the carrier or support; and Figure 3 is a front view of the wheel hub receiving carrier structure.

The carrier shown comprises a wheel receiving and supporting member 10 secured in any suitable manner to the body of an automobile, as for example by the lower brace or bracket 11 and side braces or brackets 12. The supporting member 10 is shown in the form of a circular disc having its central portion deflected outwardly to form a substantially frusto-conical boss or head 13. At its base this head is of a diameter to receive the flange 14 surrounding the opening 15 in the inner wall 16 of the inner member 17 of the wheel hub, the outer member 18 of the hub telescoping and being secured to the inner member 17, the member 18 extending rearwardly beyond its engagement with the member 17 to form an annular supporting flange 19 which acts also as a dust shield for the brake parts when the wheel is in service on the vehicle.

Spokes 20 extending from the hub member 18 secure the tire rim 21 which in turn supports a tire 22. In its outer face the hub member has the opening 23 opposite the inner opening 15 and this opening 23 is closed by a readily detachable cap or cover 24.

Within the supporting head 13 are one or more latch members 25 extending in axial planes and pivoted or secured at their outer ends to cross pins 26 which have bearing support respectively in parallel walls 27 and 28 formed by deflecting the sheet metal head 13, the head between each set of walls having a slot 29 for projection therethrough of the respective latch member. The latch members may be in the form of metal plates and each is cut away at its outer end to leave a latch shoulder 30 and an abutment shoulder 31. Suitably yielding or spring means S is provided for normally yieldingly holding the latch members with their abutment shoulders 31 against the side walls of the head 13 adjacent to the outer ends of the slots 29, and in this position the backs of the cams project outwardly a distance through the slots with the outer ends of the latch shoulders 30 above the outer ends of the slots. With this arrangement, when the wheel hub is applied to the support 10 with its opening 14 receiving the head 13, the flange 14 will engage the backs of the latch members and will swing these members inwardly against the pressure of the spring means until the inner wall 16 of the hub abuts the support 10 and the inner edge of the flange 14 has passed beyond the latch shoulders 30. When this position is reached the latch members will have been released and the spring means S swings them outwardly to position their latch shoulders in front of the flange 14, thus to lock the wheel hub and wheel to the carrier. To removal the wheel the dust cap 24 can be readily removed from the wheel hub and then with the fingers of one hand the latch members may be depressed to release their latch shoulders from the flange 14, and with the other hand the wheel can then be slid far enough outwardly to bring the flange 14 against the backs of the latch members, whereupon the wheel may then be readily lifted entirely from the carrier.

Means are preferably provided for locking the latch members in latching position. One way in which this may be accomplished is by means of an oblong locking bolt or plate secured on a rotatable shaft or pin 33 extending axially of the head 13. The locking plate may be secured to the shaft by means of a key 34 and the pin 33 may be journalled in a bushing 35 extending through the opening 36 in the outer wall of the head 13 and rigidly secured to the head. A plate 37 may be spot welded to the bushing and to the head to thus rigidly secure the bushing in position.

The outer end of the bushing forms a housing for a lock cylinder 38 whose barrel engages in the slot 39 formed in the head of the pin 33 so that when the lock barrel is turned by means of a suitable key the pin will be rotated.

In the latching arrangement shown, two latch members or pawls are provided and pivoted diametrically opposite in the head 13. Each latch member or pawl has a radially extending abutment 40 for cooperation with the locking plate or bolt 32. The length and width of the locking plate or bolt 32 are such that when the plate has its longitudinal axis in alignment with the latch members the plate will be in the path of the abutment extensions 40 of the latch members, as shown in Figure 1, so that the latch members will be locked in their latching position. When the transverse axis of the lock plate or bolt is in alignment with the latch members the plate will be clear of the abutments 40 and the latch members may be swung inwardly as illustrated in Figure 2. Normally the locking plate is in transverse position to free the latch members so that when the wheel is applied to the head 13 the latch members may be deflected to permit passage of the flange 14 over the head and to then swing outwardly back to latching position in front of the flange. After latching of the wheel head to the support 10 the lock barrel is turned by means of a key and the locking plate 32 is rotated 90°, to the position shown in Figure 1, to bring its ends in front of the abutment 40 of the latch members so that these latch members will be locked in their extended or latching position.

The spring means S hereinbefore referred to may be in the form of a leaf spring having a hole midway of its ends for receiving the outer end of the pin 33, the spring at its ends engaging against the latch members at their outer ends and being bowed to exert pressure against the members, a washer or nut 41 on the pin 33 holding the spring to the pin but permitting rotation of the pin relative to the spring. To prevent rotation of the spring with the pin flanges or ears 42 are provided at the spring ends to engage against the sides of the respective latch members.

The carrier supporting brackets 11 and 12 may be welded or riveted to the support 10, but preferably bolts 43 are used, the bolts being applied to project their threaded shanks through openings 44 in the support 10 around the head 13, and thin nuts 45 being provided for the bolts to engage against the front wall of the support 10, as clearly shown in Figure 2. The holes 44 are spaced to align with the holes 46 in the rear wall 16 of the wheel hub structure, which holes receive the bolts for securing the wheel to the hub on the vehicle. When the wheel is removed from the vehicle and applied to the carrier the ends of the bolts 43 will pass through the holes 46 in the wheel hub and after the wheel has been locked to the carrier by the latch means, cap nuts 47 are applied to the bolts 43 to engage the wheel hub and secure it rigidly to the support 10, and these cap nuts may be the same as those used for securing the wheel to the vehicle hub. By removing the dust cap 24 from the wheel hub the key controlled lock and the nuts 47 are readily accessible through the opening 23, and after the turning of the lock and securing of the nuts the dust cap is reapplied to the wheel.

To provide clearance space for the thin nuts 45 the flange 14 is offset a distance outwardly to form a bead or annular ridge 48 for abutting against the support 10 to leave the clearance space 49.

Means in the form of a locking band 50 are also provided for locking the tire against theft from the wheel when the wheel is locked to the carrier. The band is of steel and has its inner end apertured to receive the bolt 43 which secures the lower bracket 11 to the support 10. The band is U-shaped and depends from the carrier to form a loop to receive the tire and wheel rim at the bottom of the applied wheel. The outer leg of the band is bent outwardly at its end to form a hook 51 to be engaged by the edge of the wheel flange or shield 19. Normally, the band is sufficiently open so that the wheel may be inserted therein in outwardly inclined position as shown in Figure 2, and then as the wheel is swung toward the supporting head 13 the edge of the shield 19 will engage the hook end 51 and as the wheel is swung into position on the head 13 the outer leg of the band 50 is deflected and carried toward the inner leg of the band so that the loop of the band is closed and held closed by the engagement of the hook end 51 with the shield 19 as indicated in Figure 1. To strengthen the locking band against forcible removal of its outer leg from the shield 19, a tongue 52 is deflected from the hook end 51 and this tongue engages in a slot 53 formed in the inner leg of the band when the wheel is applied to the support 10, the engagement of this tongue with the inner leg of the band assisting the hook end 51 in securing the band against opening. Thus the tire is protected from unlawful removal from the wheel rim while the wheel is locked to the carrier.

Owing to the initial set of the locking band it will tend to open when its outer leg is released from the inner leg, and such opening tension is sufficient to assist in withdrawing the wheel from the support 10. When it is desired to remove the wheel from the carrier the dust cap 24 of the wheel is first removed and the nuts 47 withdrawn and the lock turned to release the locking bolt from the latch members. Then one hand is extended through the opening 23 and with the fingers the latch members are depressed sufficiently to clear the hub flange 14. The released wheel will be urged outwardly by the opening force of the band 50 and then can be readily swung away from the head 13 and then raised out of the loop of the band. The band loop also forms a convenient fulcrum for supporting in great part the weight of the wheel when it is being applied to the carrier so that with little effort on the part of the driver the wheel may be swung and guided onto the head 13 to be locked to the carrier.

I have shown a practical and efficient embodiment of the features of my invention but I do not desire to be limited to the details shown as changes and modifications may be made in construction and arrangement without departing from the scope and principles of the invention as defined in the appended claims.

I claim as follows:

1. In spare wheel carrier structure, the combination of a wheel receiving member supported from the frame of an automobile, latch members mounted on said receiving member, and operating means for said latch members yieldably projecting said latch members into the path of a wheel applied to said receiving member and projecting said latch members in interlatching engagement with a wheel after application thereof to the receiving member.

2. In spare wheel carrier structure, the combination of a spare wheel mounting member supported from the frame of an automobile, latch pawls on said mounting member, and spring means engaging said latch pawls and tending to hold said pawls in latching position whereby said pawls will yield when the hub of a spare wheel is applied to said mounting member and will then be returned to latching position to lock the wheel to said member.

3. In spare wheel supporting structure, the combination of a mounting member supported from the frame of an automobile and having a head adapted to receive and enter the hub portion of a spare wheel, radially movable latch members mounted in said head and said head having openings for said latch members, and yielding means engaging said latch members and tending at all times to project them through said openings into latching position, whereby said latch members will yield for the application of a hub portion of a spare wheel to said head and will automatically move into latching position after such application to lock the wheel to the mounting member.

4. In a spare wheel lock structure, the combination of a supporting member supported from the frame of an automobile, latch members pivotally mounted on said supporting member, and spring means adapted to automatically move said latch members into latching engagement with the hub portion of a spare wheel.

5. In a spare wheel carrier structure, the combination of a supporting member having a head for receiving the hub portion of a spare wheel, latch members on said head, spring means engaging said latch members and tending to project them from said head into latching position, and a locking plate adapted to be moved into position to lock said latch members in latching position.

6. In spare wheel carrier structure, the combination of a supporting element having a head for receiving the hub portion of a spare wheel to be carried, latch members mounted on said head and said head having openings for said latch members, spring means engaging said latch members and tending to project them at all times through said openings and to hold them in latching position whereby said latch members will yield to the application of a hub portion thereto and will assume latching position after such application, and key controlled locking means for locking said latch members against retraction.

7. In spare wheel carrier structure, the combination of a supporting member having a substantially frusto-conical head extending therefrom for receiving and entering the hub portion of a spare wheel to be carried, latch pawls within said head and said head having openings through which said pawls may be projected into latching position, spring means engaging said pawls and tending to hold them in latching position whereby said pawls will yield to the application of a hub portion to the head and will thereafter move back to latching position to lock the hub portion to the head, and key controlled means for locking said pawls against retraction.

8. In carrier structure for spare wheels of an automobile, the combination of a supporting member, locking means on said supporting member for receiving and interlockingly engaging the hub part of a wheel applied to the supporting member, a locking loop for the rim and tire of a wheel to be carried, said loop at its inner end being supported from said supporting member, and means whereby insertion of the tire and rim of a wheel in said loop and application of the wheel to the supporting member automatically closes and locks said loop around the rim and tire.

9. In carrier structure for automobile spare wheels, the combination of a supporting member having locking means adapted for interlocking engagement with the hub part of a wheel when applied thereto, a locking loop for the rim and tire of the wheel to be carried, one end of said loop being secured and supported from the supporting member, said loop being normally open to receive the rim and tire of a wheel to be carried, and means automatically controlled by the application of a wheel to the supporting member for interlocking the other end of said loop with said wheel and the supported end of said loop whereby said loop is locked closed around the rim and tire.

10. In carrier structure for spare wheels of automobiles, the combination of supporting means having locking means for interlocking engagement with the hub of a wheel to be carried, a resilient metal loop supported at one end from said supporting means and being normally open to receive the tire and rim of a wheel to be carried, and means for automatically interlocking the other end of said loop with said wheel by the application of a wheel to the supporting means.

11. In carrier structure for spare wheels of automobiles, the combination of supporting means for receiving and mounting the hub part of a wheel to be carried, a locking loop for receiving the rim and tire of a wheel to be carried, one end of said loop being supported from said supporting means, and means automatically controlled by the application of a wheel to the supporting means to interlock the ends of said loop to thereby lock the loop around the rim and tire of the wheel.

CHARLES H. NEHLS.